US011978118B2

(12) United States Patent
Mukherjee

(10) Patent No.: US 11,978,118 B2
(45) Date of Patent: *May 7, 2024

(54) EVENT MANAGEMENT AND VALIDATION PLATFORM USING A RECURSIVE HIERARCHIC BLOCKCHAIN

(71) Applicant: Bank of America Corporation, Charlotte, NC (US)

(72) Inventor: Maharaj Mukherjee, Poughkeepsie, NY (US)

(73) Assignee: Bank of America Corporation, Charlotte, NC (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/853,994

(22) Filed: Jun. 30, 2022

(65) Prior Publication Data
US 2022/0335525 A1 Oct. 20, 2022

Related U.S. Application Data

(63) Continuation of application No. 16/736,196, filed on Jan. 7, 2020, now Pat. No. 11,416,933.

(51) Int. Cl.
*G06Q 40/04* (2012.01)
*G06F 16/22* (2019.01)
*G06F 16/23* (2019.01)
*G06F 16/27* (2019.01)
*G06F 21/62* (2013.01)

(52) U.S. Cl.
CPC ......... *G06Q 40/04* (2013.01); *G06F 16/2255* (2019.01); *G06F 16/2379* (2019.01); *G06F 16/27* (2019.01); *G06F 21/6218* (2013.01)

(58) Field of Classification Search
CPC ........ G06Q 20/10; G06Q 20/38; G06Q 20/40; G06Q 20/32
See application file for complete search history.

(56) References Cited

U.S. PATENT DOCUMENTS 6,938,039 B1 8/2005 Bober et al.
9,892,460 B1 2/2018 Winklevoss et al.
(Continued)

FOREIGN PATENT DOCUMENTS

| CN | 109639550 A | 4/2019 |
| CN | 109919771 A | 6/2019 |
| WO | 03012714 A1 | 2/2003 |

OTHER PUBLICATIONS

Ron Miller "Xage now supports hierarchical blockchains for complex implementations" Tech Crunch https://techcrunch.com/2019/10/10/xage-now-supports-hierarchical-blockchains-for-complex-implementations/2019/10/10/xage-now-supports-hierarchical-blockchains-for-complex-implementations/ Oct. 10, 2019, pp. 1-9.
(Continued)

*Primary Examiner* — Scott S Trotter
(74) *Attorney, Agent, or Firm* — Banner & Witcoff, Ltd.

(57) ABSTRACT

Aspects of the disclosure relate to implementation of a recursive hierarchic blockchain for event validation and processing. A computing platform may receive event data from first and second data sources. The computing platform may store, in a first distributed ledger, an event record for each event from the first data source and may store, in a second distributed ledger, an event record for each event from both data sources. In response to determining that a validation condition for a current block of the second distributed ledger has been satisfied, the computing platform may compute a hash and generate a numeric representation of the first distributed ledger. In a new block of the second distributed ledger, the computing platform may store the hash and the numeric representation. The computing platform may write, to the new block of the second distributed ledger, additional event data from both data sources.

20 Claims, 11 Drawing Sheets

(56) References Cited

U.S. PATENT DOCUMENTS

| | | |
|---|---|---|
| 9,898,782 B1 | 2/2018 | Winklevoss et al. |
| 9,965,804 B1 | 5/2018 | Winklevoss et al. |
| 9,965,805 B1 | 5/2018 | Winklevoss et al. |
| 10,002,389 B1 | 6/2018 | Winklevoss et al. |
| 10,068,228 B1 | 9/2018 | Winklevoss et al. |
| 10,255,635 B1 | 4/2019 | Winklevoss et al. |
| 10,325,257 B1 | 6/2019 | Winklevoss et al. |
| 10,346,428 B2 | 7/2019 | Madhavan et al. |
| 10,404,469 B2 | 9/2019 | Madhavan et al. |
| 10,417,217 B2 | 9/2019 | Pierce et al. |
| 10,497,038 B2 | 12/2019 | Stevenson et al. |
| 2016/0092988 A1 | 3/2016 | Letourneau |
| 2016/0342977 A1 | 11/2016 | Lam |
| 2017/0228822 A1 | 8/2017 | Creighton, IV et al. |
| 2018/0189333 A1 | 7/2018 | Childress et al. |
| 2018/0349621 A1 | 12/2018 | Schvey et al. |
| 2020/0396072 A1 | 12/2020 | Maurer et al. |

OTHER PUBLICATIONS

"Average Confirmation Time - Blockchain" https://www.blockchain.com/en/charts/avg-confirmation-time website visited Jan. 3, 2020, 1 page.

"Ethereum Block Time Historical Chart" https://bitinfocharts.com/comparison/ethereum-confirmationtime.html website visited Jan. 7, 2020, 1 page.

Jan. 6, 2022—(US) Office Action—U.S. Appl. No. 16/736,196.

May 16, 2022 Notice of Allowance U.S. Appl. No. 16/736,196.

305

Event Processing Interface

We're sorry. Your transaction could not be verified, and has not been processed as requested. Please request an alternative transaction.

Event Processing Interface

Congratulations – your transaction has been verified and completed as requested.

FIG. 4

EVENT MANAGEMENT AND VALIDATION PLATFORM USING A RECURSIVE HIERARCHIC BLOCKCHAIN

CROSS-REFERENCE TO RELATED APPLICATIONS

This application claims the benefit of and is a continuation of U.S. patent application Ser. No. 16/736,196, filed Jan. 7, 2020, and entitled "Event Management and Validation Platform Using a Recursive Hierarchic Blockchain," which is incorporated by reference herein in its entirety.

BACKGROUND

Aspects of the disclosure relate to event management and validation platforms. In particular, one or more aspects of the disclosure relate to computing platforms that implement blockchain ledgers for event processing.

In some cases, enterprise organizations such as financial institutions may implement traditional closed ledgers to maintain transaction records (such as electronic trading records or the like). In some instances, these closed ledgers may contain inaccuracies, as entries may be modified, concealed, and/or invalid upon entry. Blockchains are becoming increasingly popular tools for managing information beyond their original application to cryptocurrency. Because each transaction in a blockchain has to be validated by all existing nodes of the blockchain, however, it may take a significant amount of time to complete a transaction if the blockchain is relatively large. This delay can make blockchains ill-suited for some financial institution applications, such as electronic trading which operates at a high frequency. As a result, it may be difficult for financial institutions to gain the advantages of using a blockchain in the context of certain applications.

SUMMARY

Aspects of the disclosure provide effective, efficient, scalable, and convenient technical solutions that address and overcome the technical problems associated with the implementation of blockchain-based, open-ledger systems in certain use cases, such as event processing and electronic trading. For example, some aspects of the disclosure provide techniques that may enable computing devices to bridge a time gap between the conventionally different speeds of electronic trading and blockchain processing. In doing so, various technical advantages may be realized. For example, one technical advantage of a blockchain-based, open-ledger over traditional ledgers is that all transactional entries in a blockchain ledger are always correct and valid due to the enforcement of all new transactions by existing nodes of the blockchain. A further advantage is that all entries in the blockchain-based, open-ledger are shared and open to all participants of the blockchain, which guarantees auditing of each transaction. As yet a further advantage, entries in a blockchain-based, open-ledger are immutable, and thus cannot be modified once entered. By integrating blockchain-based, open-ledger systems with electronic trading systems, these and/or other technical advantages may be realized in the context of electronic trading.

In accordance with one or more embodiments of the disclosure, a computing platform comprising at least one processor, a communication interface, and memory storing computer-readable instructions may receive first event data from a first data source and second event data from a second data source. Next, the computing platform may store, in a first distributed ledger, an event record for each event represented by the first event data and store, in a second distributed ledger, an event record for each event represented by the first event data and the second event data. In response to determining that a validation condition for a current block of the second distributed ledger has been satisfied, the computing platform may compute a first hash, and generate a numeric representation of the first distributed ledger. In a new block of the second distributed ledger, the computing platform may store the first hash and the numeric representation of the first distributed ledger. Subsequently, the computing platform may write, to the new block of the second distributed ledger, additional event data from the first data source and the second data source.

In one or more instances, the computing platform may receive an event processing request from a user device. In response to receiving the event processing request from the user device, the computing platform may verify that processing of an event requested in the event processing request is permissible.

In one or more instances, the event processing request may be a request from a user account to transfer one or more assets. In these instances, the computing platform may verify that the processing of the event requested in the event processing request is permissible by verifying that the user account has rights to the one or more assets.

In one or more instances, the computing platform may determine, by verifying that processing of the event requested in the event processing request is permissible, that the user account does have the rights to the one or more assets. In response to determining that the user account does have the rights to the one or more assets, the computing platform may send one or more commands directing an event processing system to process the event processing request. In some instances, sending the one or more commands directing the event processing system to process the event processing request may result in transfer of the one or more assets from the user account.

In one or more instances, the computing platform may determine, by verifying that processing of the event requested in the event processing request is permissible, that the user account does not have the rights to the one or more assets. In response to determining that the user account does not have the rights to the one or more assets, the computing platform may send one or more commands directing the user device to display an error message indicating that the event could not be processed. In some instances, sending the one or more commands directing the user device to display the error message may cause the user device to display the error message.

In one or more instances, the computing platform may receive third event data from a third data source. The computing platform may store, in a third distributed ledger, an event record for each event represented by the third event data and the event records for each event represented by the first event data and the second event data. In response to determining that a validation condition for a current block of the third distributed ledger has been satisfied, the computing platform may compute a second hash and generate a numeric representation of the second distributed ledger. In a new block of the third distributed ledger, the computing platform may store the second hash and the numeric representation of the second distributed ledger. Subsequently, the computing platform may write, to the new block of the third distributed ledger, additional event data from the first data source, the second data source, and the third data source.

In one or more instances, the event records stored in the first distributed ledger may be records that are processed at a first speed, the event records stored in the second distributed ledger may be records that are processed at a second speed, slower than the first speed, and the event records stored in the third distributed ledger may be records that are processed at a third speed, slower than the second speed. In some instances, the event records stored in the first distributed ledger may be records of equity trades. In these instances, the event records stored in the second distributed ledger may be records associated with one or more of: mutual funds or exchange traded funds (ETFs). Furthermore, in these instances, the numeric representation of the first distributed ledger may be a numeric representation of the records of the equity trades. In some instances, the event records stored in the third distributed ledger may be records associated with one or more of: loan transactions, credit card transactions, or cryptocurrency transactions. In these instances, the numeric representation of the second distributed ledger may be a numeric representation of the records associated with the one or more of: the loan transactions, credit card transactions, or cryptocurrency transactions. In one or more instances, the numeric representation of the first distributed ledger may be a 256 bit hexadecimal number.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3 and 4 depict illustrative user interfaces for implementing a recursive hierarchic blockchain in event validation and processing in accordance with one or more example embodiments;

DETAILED DESCRIPTION

Figure 1A:
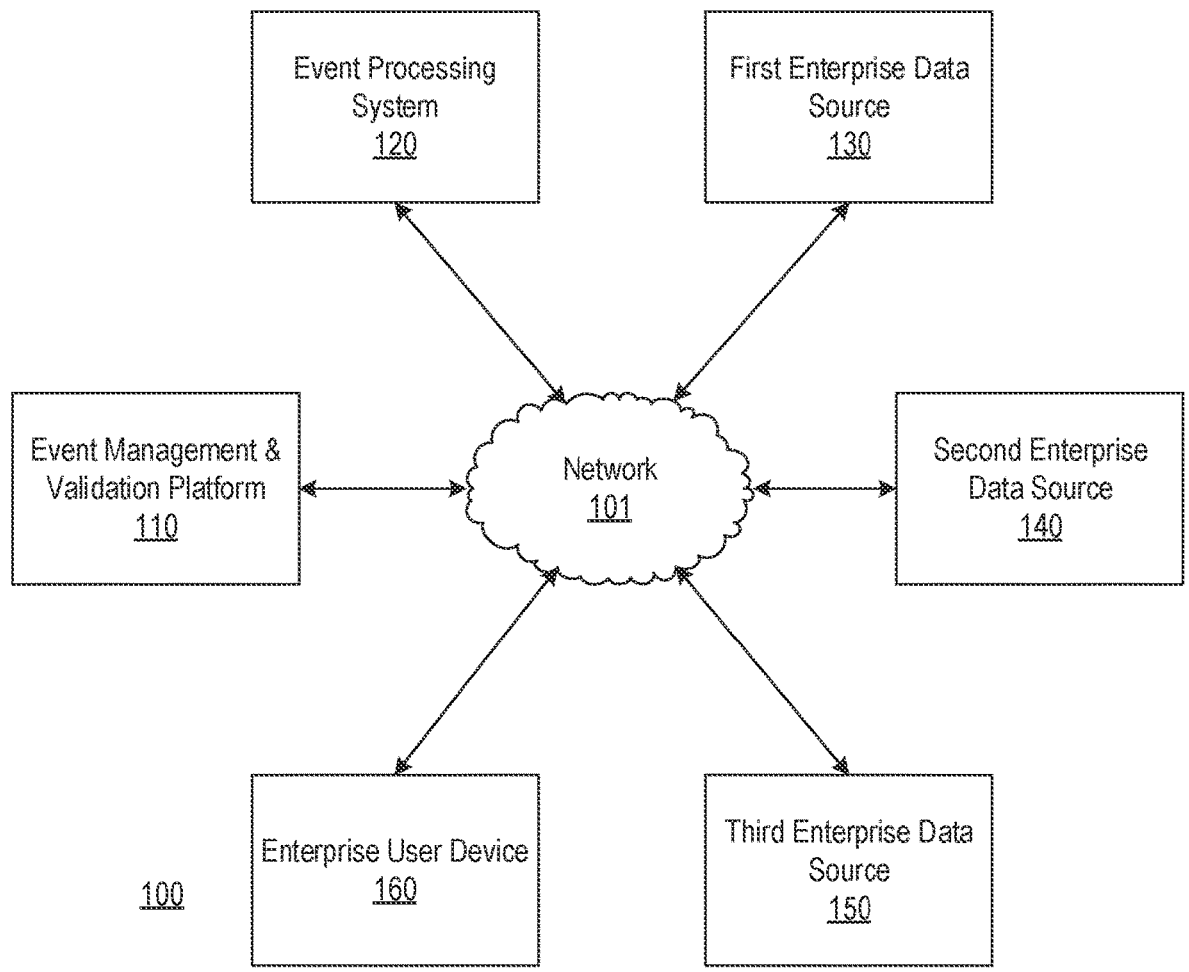
FIGS. 1A-1B depict an illustrative computing environment for implementing a recursive hierarchic blockchain in event validation and processing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively manage and validate event processing requests using a recursive hierarchic blockchain. For example, blockchains are becoming more and more popular beyond their original application to crypto-currencies. An advantage of a blockchain-based open and shared ledger, in comparison to traditional ledgers, is that all transactional entries in a blockchain-based, open-ledger are, by virtue of being on the blockchain, always correct and valid. The validity of all transactions is enforced by the existing nodes of the blockchain, and thus an invalid transaction cannot be entered into the blockchain. Another advantage of blockchain ledgers is that all entries are shared and open to all participants of the blockchain, and thus auditing of each transaction is also guaranteed. In fact, creating an audit-trail of all transactions is natural for blockchain-based open ledgers that allow smart contracts (e.g., such as for a cryptocurrency). Furthermore, entries to blockchain-based, open-ledgers are also immutable and thus cannot be modified by anyone once entered. Regulatory requirements on electronic trading transactions and maintaining accuracy of an audit trail may make blockchain-based open ledgers an attractive alternative to current closed ledger systems that might being used by various organizations (e.g., such as financial institutions).

Unfortunately, however, blockchains may operate slowly as a result of their insistence on correctness and validity. Since each transaction must be validated by all existing nodes, it may take a long time for a transaction to be completed. For example, average confirmation times for certain cryptocurrencies may run as long as thirty to forty minutes, with an average transaction time of roughly fifteen seconds. This may be too long to meet the demands on fast electronic trading. Since the number of blocks in blockchains only increases with time, the average transaction time similarly increases. For effective electronic trading, an average transaction time should run in the order of a few milliseconds (and even faster as technology for computer architecture and 5G networking technology progress).

This slow speed issue presents an impediment for using blockchain-based open ledger systems for electronic trading as there may be a large time scale difference between the two technologies, which itself increases over time. Aspects of the disclosure provide technology that not only may help bridge the gap and make blockchain-based open ledger systems useful for electronic trading, but also that may adapt with the technological changes over time. In particular, one or more aspects of the disclosure describe hierarchic, blockchain-based open-ledger systems for electronic trading that may address these and/or other issues.

For example, security of each transaction may be maintained within a blockchain using 256 bit secure sockets layer (SSL) encryption. Each smart contract in a block (e.g., a cryptocurrency smart contract) may be converted into a unique 256 bit hexadecimal number, and its validity and correctness may be checked by other nodes to make sure that all checks generate the same unique 256 bit hexadecimal number. A technical advantage of the 256 bit SSL encryption is that it may convert any large volume of information uniquely into one single 256 bit hexadecimal number.

In implementing one or more aspects of the disclosure, a blockchain containing all the blocks of transactional information and smart contracts, including blockchain connectivity topology, up to a given point in time (e.g., the current time) may be reduced to a unique 256 bit hexadecimal number. This conversion may be done using similar 256-bit calculations as may be used in 256-bit encryption and may facilitate implementation of the hierarchic blockchain-based open-ledger system described herein.

The system described herein may be a hierarchic blockchain-based open-ledger system made of a plurality of block chains arranged in a hierarchic tree structure. A blockchain containing information at an initial level (e.g., child level) may be reduced using 256 bit SSL encryption into one unique 256 bit hexadecimal number and that number may be included as part of a smart contract in second level (e.g., parent level). The correctness and validity of each block may be checked and established at each level of the hierarchy—although this might not all be checked at the same time. Rather, the confirmation of validity may be performed at different frequency levels where a time scale is faster at the lowest level and slows down with each higher level in the hierarchy.

In doing so, the lowest level blockchains are the fastest, and they are kept fast enough to record and maintain validity and an audit trail of electronic trading. In other words, the lowest level blockchains may be fast enough to record electronic trading transactions. In some instances, performance at the various blockchains may be enhanced by limiting the number of blocks in the blockchains at the respective levels.

The time scale on the highest level may match to the available frequency of transactions available at the ultimate blockchain where transactions may be entered as an open ledger. As mentioned above, the frequency of this ultimate blockchain may deviate significantly from the lowest level blockchain described above.

The system described herein may put several levels of hierarchy in between the lowest and highest levels of the hierarchical chains to match the time scale between these levels. For example, the levels may grow in the order of tens—from milliseconds (ms) to 10 ms, to 100 ms, to seconds, to 10 seconds, or the like.

In some instances, the entire hierarchic blockchain may be made either private or public or a hybrid combination of both. Additionally or alternatively, the hierarchic blockchain may be made either supervised using a master-slave architecture of nodes or unsupervised using a peer-to-peer architecture or a hybrid combination of both. In some instances, the nodes at each level of the hierarchic blockchain may be implemented using a completely distributed computing system, or the same node may perform the computation of different levels in a virtually distributed computing system.

As a result, a hierarchic blockchain-based open-ledger system for electronic trading with varying transaction frequencies may be implemented. As is described further below, frequency of transactions at the lowest level may match that of electronic trading, and frequency at the highest level may match that of the final blockchain where other transactions may be recorded, with several levels in between. The blockchain at a child level may be converted into a 256 bit hexadecimal number with all the recorded transactions and topology and included in its parent level as part of a smart contract. These levels may be further adjusted based on requirements of available speeds for electronic trading and an ultimate speed of the blockchain being written to. In some instances, performance at each level may be improved by fixing a number of blocks in each level.

By bridging the frequency gaps between a blockchain ledger for high frequency trading and another blockchain ledger for an entirety of transactions processed, one or more aspects of the systems and methods described herein may achieve the benefits of a blockchain open ledger in the context of electronic trading. For example, such systems and methods may result in an authenticated and validated series of transaction records, thus providing an advantage over traditional ledgers. Furthermore, by implementing blockchain in electronic trading, the systems and methods described herein may provide an additional technical advantage in creating shared entries that may be open to all blockchain participants, and thus may result in a verified audit-trail. As yet another technical advantage, because the validity of entered transactions is enforced by existing blockchain nodes, invalid transactions may not be entered into the ledger. These and other features and technical advantages are described further below.

Figure 1B:
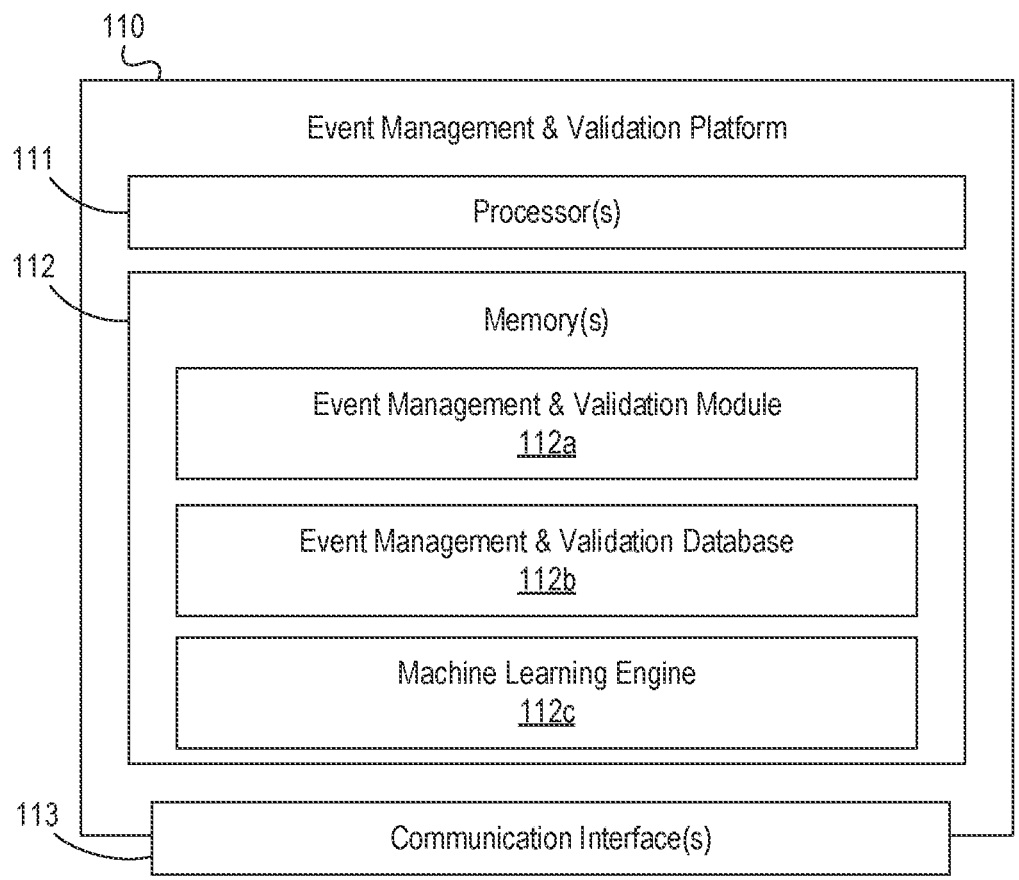

FIGS. 1A-1B depict an illustrative computing environment that implements a recursive hierarchic blockchain for event validation and processing in accordance with one or more example embodiments. Referring to FIG. 1A, computing environment 100 may include one or more computer systems. For example, computing environment 100 may include an event management and validation platform 110, an event processing system 120, a first enterprise data source 130, a second enterprise data source 140, a third enterprise data source 150, and an enterprise user device 160.

As described further below, event management and validation platform 110 may be a computer system that includes one or more computing devices (e.g., servers, server blades, or the like) and/or other computer components (e.g., processors, memories, communication interfaces) that may be used to generate and maintain a recursive hierarchic blockchain for event validation and processing. In some instances, the event management and validation platform 110 may be maintained by an enterprise organization such as a financial institution, and may be configured to receive requests from one or more enterprise user devices (e.g., enterprise user device 160), which may each be linked to and/or otherwise associated with customers of the financial institution (e.g., electronic trading requests, credit card transaction requests, loan transactions requests, or the like), and/or one or more enterprise data sources (e.g., first enterprise data source 130, second enterprise data source 140, third enterprise data source 150, or the like) that may maintain records of these requests.

Event processing system 120 may be a server, desktop computer, laptop computer, tablet, mobile device, or the like, that is configured to process events (e.g., transactions) in response to requests and/or commands from enterprise user devices, event management and validation platform 110, or the like. For example, event processing system 120 may be configured to execute a stock trade, buy or sell a cryptocurrency, transfer funds from one account to another, or the like. In some instances, event processing system 120 may be maintained by the same enterprise organization maintaining the event management and validation platform 110.

First enterprise data source 130 may be one or more computing devices (servers, server blades, or the like) that may be configured to store event data (e.g., a plurality of historical transactions of a particular type and/or various specific types). For example, the first enterprise data source 130 may be configured to store transaction data such as information identifying details of various loan transactions, credit card transactions, cryptocurrency transactions, mutual fund transactions, exchange traded fund (ETF) transactions, equity trades, or the like, and may provide information about the stored transaction data upon request (e.g., to the event management and validation platform 110). In some instances, the first enterprise data source 130 may also be maintained by the enterprise organization maintaining the event management and validation platform 110 and/or event processing system 120.

Second enterprise data source 140 may be one or more computing devices (servers, server blades, or the like) that may be configured to store event data (e.g., a plurality of historical transactions of a particular type and/or various specific types). For example, the second enterprise data source 140 may be configured to store transaction data such as information identifying details of various loan transactions, credit card transactions, cryptocurrency transactions, mutual fund transactions, ETF transactions, equity trades, or the like, and may provide information about the stored transaction data upon request (e.g., to the event management and validation platform 110). In some instances, the second enterprise data source 140 may also be maintained by the enterprise organization maintaining the event management and validation platform 110, event processing system 120, and/or first enterprise data source 130. In some instances, the second enterprise data source 140 may store transaction data different than the transaction data stored at the first enterprise data source 130 (e.g., transaction data that may be processed at a different frequency than the transaction data stored at the first enterprise data source 130).

Third enterprise data source 150 may be one or more computing devices (servers, server blades, or the like) that may be configured to store event data (e.g., a plurality of historical transactions of a particular type and/or various specific types). For example, the third enterprise data source 150 may be configured to store transaction data such as information identifying details of loan transactions, credit card transactions, cryptocurrency transactions, mutual fund transactions, ETF transactions, equity trades, or the like, and may provide information about the stored transaction data upon request (e.g., to the event management and validation platform 110). In some instances, the third enterprise data source 150 may also be maintained by the enterprise organization maintaining the event management and validation platform 110, event processing system 120, first enterprise data source 130, and/or second enterprise data source 140. In some instances, the third enterprise data source 150 may store transaction data different than the transaction data stored at the first enterprise data source 130 and/or second enterprise data source 140 (e.g., transaction data that may be processed at a different frequency than the transaction data stored at the first enterprise data source 130 and/or second enterprise data source 140).

Enterprise user device 160 may be a desktop computer, laptop computer, tablet, mobile device, or the like, and may be used by an individual such as a customer of the enterprise organization (e.g., a financial institution). For example, the enterprise user device 160 may request transactions, trades, or the like in response to receiving user input. In addition, enterprise user device 160 may be configured to cause display of and/or otherwise present one or more graphical user interfaces (e.g., interfaces that indicate successful or failed attempts to process a requested event, or the like).

Computing environment 100 also may include one or more networks, which may interconnect event management and validation platform 110, event processing system 120, first enterprise data source 130, second enterprise data source 140, third enterprise data source 150, and enterprise user device 160. For example, computing environment 100 may include a network 101 (which may interconnect, e.g., event management and validation platform 110, event processing system 120, first enterprise data source 130, second enterprise data source 140, third enterprise data source 150, and enterprise user device 160).

In one or more arrangements, event management and validation platform 110, event processing system 120, first enterprise data source 130, second enterprise data source 140, third enterprise data source 150, and enterprise user device 160 may be any type of computing device capable of sending and/or receiving requests and processing the requests accordingly. For example, event management and validation platform 110, event processing system 120, first enterprise data source 130, second enterprise data source 140, third enterprise data source 150, enterprise user device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event management and validation platform 110, event processing system 120, first enterprise data source 130, second enterprise data source 140, third enterprise data source 150, and enterprise user device 160 may, in some instances, be special-purpose computing devices configured to perform specific functions.

Referring to FIG. 1B, event management and validation platform 110 may include one or more processors 111, memory 112, and communication interface 113. A data bus may interconnect processor 111, memory 112, and communication interface 113. Communication interface 113 may be a network interface configured to support communication between event management and validation platform 110 and one or more networks (e.g., network 101, or the like). Memory 112 may include one or more program modules having instructions that when executed by processor 111 cause event management and validation platform 110 to perform one or more functions described herein and/or one or more databases that may store and/or otherwise maintain information which may be used by such program modules and/or processor 111. In some instances, the one or more program modules and/or databases may be stored by and/or maintained in different memory units of event management and validation platform 110 and/or by different computing devices that may form and/or otherwise make up event management and validation platform 110. For example, memory 112 may have, host, store, and/or include event management and validation module 112a, event management and validation database 112b, and a machine learning engine 112c.

Event management and validation module 112a may have instructions that direct and/or cause event management and validation platform 110 to execute advanced techniques related to event processing and validation, as discussed in greater detail below. Event management and validation database 112b may store information used by event management and validation module 112a and/or event management and validation platform 110 in generating and maintaining a recursive hierarchic blockchain, and/or in performing other functions. Machine learning engine 112c may have instructions that direct and/or cause the event management and validation platform 110 to set, define, and/or iteratively refine optimization rules and/or other parameters used by the event management and validation platform 110 and/or other systems in computing environment 100.

Figure 2A:
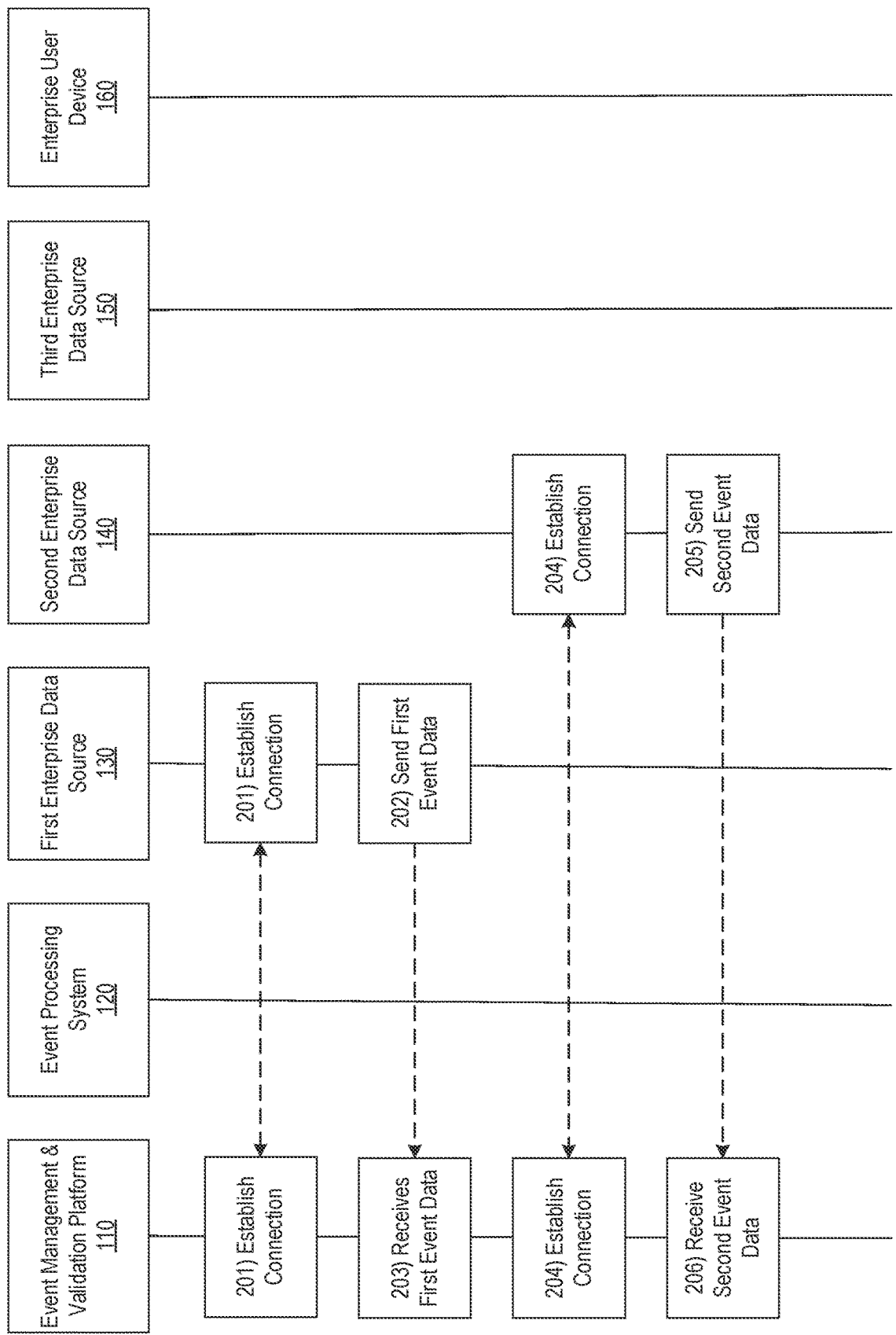
FIGS. 2A-2F depict an illustrative event sequence for implementing a recursive hierarchic blockchain in event validation and processing in accordance with one or more example embodiments.

FIGS. 2A-2F depict an illustrative event sequence that implements a recursive hierarchic blockchain for event validation and processing in accordance with one or more example embodiments. Referring to FIG. 2A, at step 201, the event management and validation platform 110 may establish a connection with the first enterprise data source 130. In some instances, the event management and validation platform 110 may establish a first wireless data connection with the first enterprise data source 130 to link the event management and validation platform 110 to the first enterprise data source 130. In some instances, the event management and validation platform 110 may identify whether there is already a connection established with the first enterprise data source 130. If there is already a connection established with the first enterprise data source 130, the event management and validation platform 110 might not reestablish the connection. However, if there is not already a connection established with the first enterprise data source 130, the event management and validation platform 110 may establish the first wireless data connection as described herein.

At step 202, the first enterprise data source 130 may send, share, or otherwise provide first event data to the event management and validation platform 110. In some instances, the first enterprise data source 130 may send the first event data to the event management and validation platform 110 while the first wireless data connection is established. For illustrative purposes, it may be assumed that in sending the first event data to the event management and validation platform 110, the first enterprise data source 130 may send information about historical high frequency equity trades to the event management and validation platform 110, though it should be understood that any type of event data may be sent from the first enterprise data source 130 (e.g., loan transactions, credit card transactions, cryptocurrency transactions, mutual fund transactions, ETF transactions, equity trades, or the like).

At step 203, the event management and validation platform 110 may receive or otherwise access the first event data sent at step 202. In one or more instances, the event management and validation platform 110 may receive the first event data via the communication interface 113 while the first wireless data connection is established. In continuing with the illustrative example from step 202, it may be assumed that in receiving the first event data, the event management and validation platform 110 may receive information about historical high frequency equity trades.

At step 204, the event management and validation platform 110 may establish a connection with second enterprise data source 140. In one or more instances, the event management and validation platform 110 may establish a second wireless data connection with the second enterprise data source 140 to link the event management and validation platform 110 to the second enterprise data source 140. In some instances, the event management and validation platform 110 may identify whether or not a connection is already established with the second enterprise data source 140. If a connection is already established with the second enterprise data source 140, the event management and validation platform 110 might not re-establish the connection. However, if a connection was not previously established with the second enterprise data source 140, the event management and validation platform 110 may establish the second wireless data connection as described herein.

At step 205, the second enterprise data source 140 may send, share, or otherwise provide second event data to the event management and validation platform 110. In one or more instances, the second enterprise data source 140 may send the second event data to the event management and validation platform 110 while the second wireless data connection is established. For illustrative purposes, it may be assumed that in sending the second event data to the event management and validation platform 110, the second enterprise data source 140 may send information about historical mutual funds and/or ETF trades to the event management and validation platform 110, though it should be understood that any type of event data may be sent from the second enterprise data source 140 (e.g., information identifying details about loan transactions, credit card transactions, cryptocurrency transactions, mutual fund transactions, ETF transactions, equity trades, or the like).

At step 206, the event management and validation platform 110 may receive or otherwise access the second event data from the second enterprise data source 140. In some instances, the event management and validation platform 110 may receive the second event data via the communication interface 113 and while the second wireless data connection is established. To follow the illustrative example described at step 205, it may be assumed that at step 206, the event management and validation platform 110 may receive information about historical mutual funds and/or ETF trades from the second enterprise data source 140.

Figure 2B:
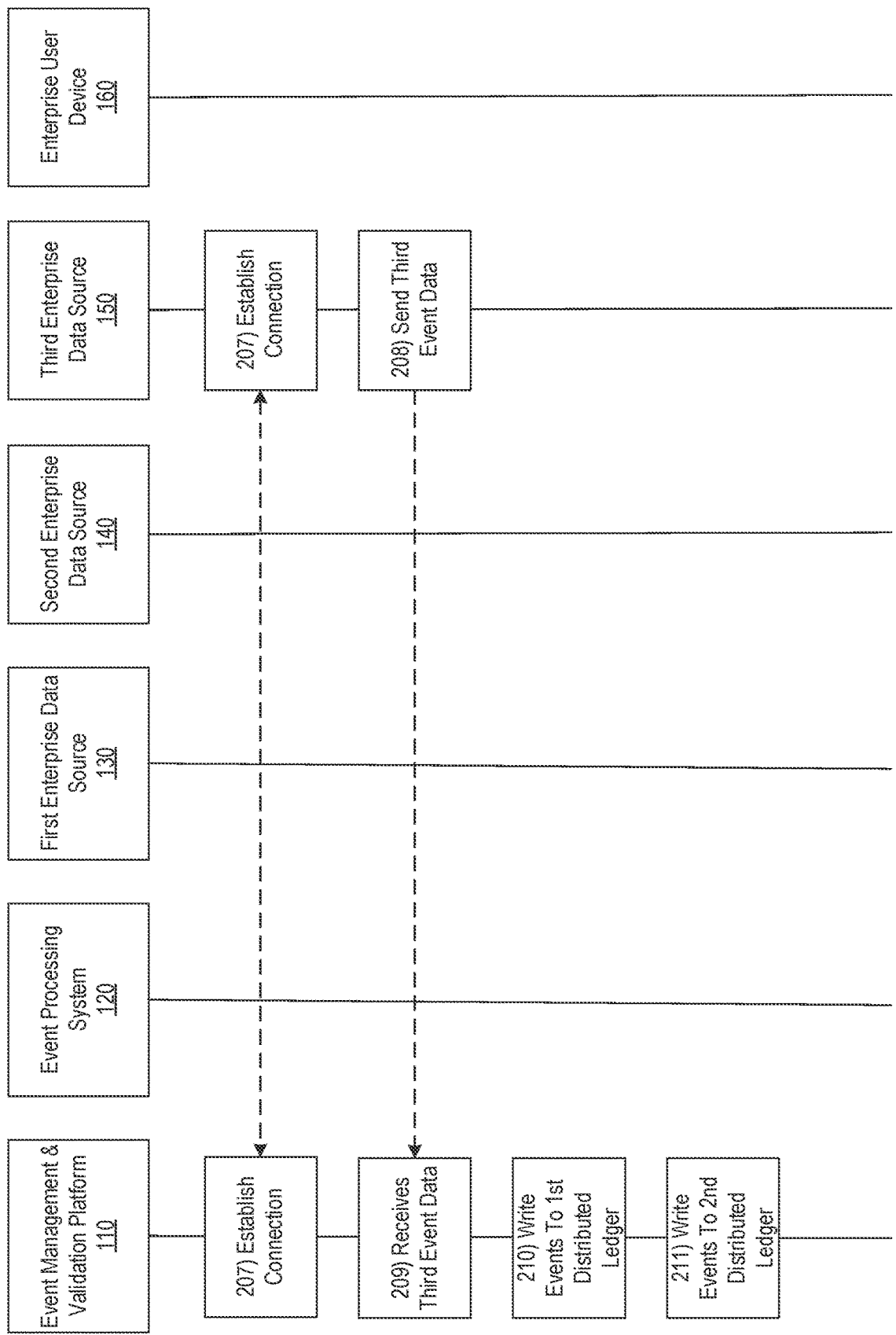

Referring to FIG. 2B, at step 207, the event management and validation platform 110 may establish a connection with the third enterprise data source 150. In one or more instances, the event management and validation platform 110 may establish a third wireless data connection with the third enterprise data source 150 to link the event management and validation platform 110 with the third enterprise data source 150. In some instances, the event management and validation platform 110 may identify whether or not a connection is already established with the third enterprise data source 150. If a connection is already established with the third enterprise data source 150, the event management and validation platform 110 might not re-establish the connection. However, if a connection was not previously established with the third enterprise data source 150, the event management and validation platform 110 may establish the third wireless data connection as described herein.

At step 208, the third enterprise data source 150 may send, share, or otherwise provide third event data to the event management and validation platform 110. In some instances, the third enterprise data source 150 may send third event data to the event management and validation platform 110 while the third wireless data connection is established. For illustrative purposes, it may be assumed that in sending the third event data to the event management and validation platform 110, the third enterprise data source 150 may send information about historical loan and/or credit card transactions to the event management and validation platform 110, though it should be understood that any type of event data may be sent from the third enterprise data source 150 (e.g., information identifying details about loan transactions, credit card transactions, cryptocurrency transactions, mutual fund transactions, ETF transactions, equity trades, or the like).

At step 209, the event management and validation platform 110 may receive or otherwise access the third event data sent at step 208. In some instances, the event management and validation platform 110 may receive the third event data via the communication interface 113 and while the third wireless data connection is established. To continue with the example described at step 208, in receiving the third event data, the event management and validation platform 110 may receive information about historical loan and/or credit card transactions.

At step 210, the event management and validation platform 110 may begin to write events, based on the first event data, the second event data, and the third event data, to a first distributed ledger. In writing events to the first distributed ledger, the event management and validation platform 110 may identify events to be processed at a frequency higher than the remaining events. For example, the event management and validation platform 110 may identify that the first event data (e.g., high frequency equity trades) may be processed at a faster frequency than the events described in the second event data and the third event data. Accordingly, in this example, the event management and validation platform 110 may write the first event data to the first distributed ledger (e.g., because the first distributed ledger allows for processing at a relatively faster frequency and thus facilitates processing of the high frequency equity trades). In writing the first event data to the first distributed ledger, the event management and validation platform 110 may write the first event data to a first blockchain maintained by the event management and validation platform 110. In one or more instances, in writing the first event data to the first distributed ledger, the event management and validation platform 110 may include hashing and/or encoding the first event data into a Merkle tree maintained at the event management and validation platform 110.

At step 211, the event management and validation platform 110 may begin to write events, based on the first event data, the second event data, and the third event data, to a second distributed ledger. In writing events to the second distributed ledger, the event management and validation platform 110 may identify events to be processed at a frequency lower than the event data stored in the first distributed ledger at step 210, but higher than the remaining events. For example, the event management and validation platform 110 may identify that the second event data (which may, e.g., include information identifying mutual fund and/or ETF trades) may be processed at a slower frequency than the events described in the first event data, but faster than the events described in the third event data. Accordingly, in this example, the event management and validation platform 110 may write the second event data to the second distributed ledger. In writing the second event data to the second distributed ledger, the event management and validation platform 110 may write the second event data to a second blockchain maintained by the event management and validation platform 110. In some instances, in addition to writing the second event data to the second distributed ledger, the event management and validation platform 110 may also write the first event data to the second distributed ledger (e.g., the first distributed ledger may be a child blockchain of the second distributed ledger, and the second distributed ledger may include the events written to the first distributed ledger as well as additional events not written to the first distributed ledger). In some instances, the event management and validation platform 110 may validate the second distributed ledger at a lower frequency than the first distributed ledger (e.g., because the second distributed ledger may contain more data—i.e., both the first event data and the second event data—and thus may take more time to validate). In one or more instances, in writing the second event data to the second distributed ledger, the event management and validation platform 110 may include hashing and/or encoding the second event data into a Merkle tree maintained at the event management and validation platform 110.

Figure 2C:
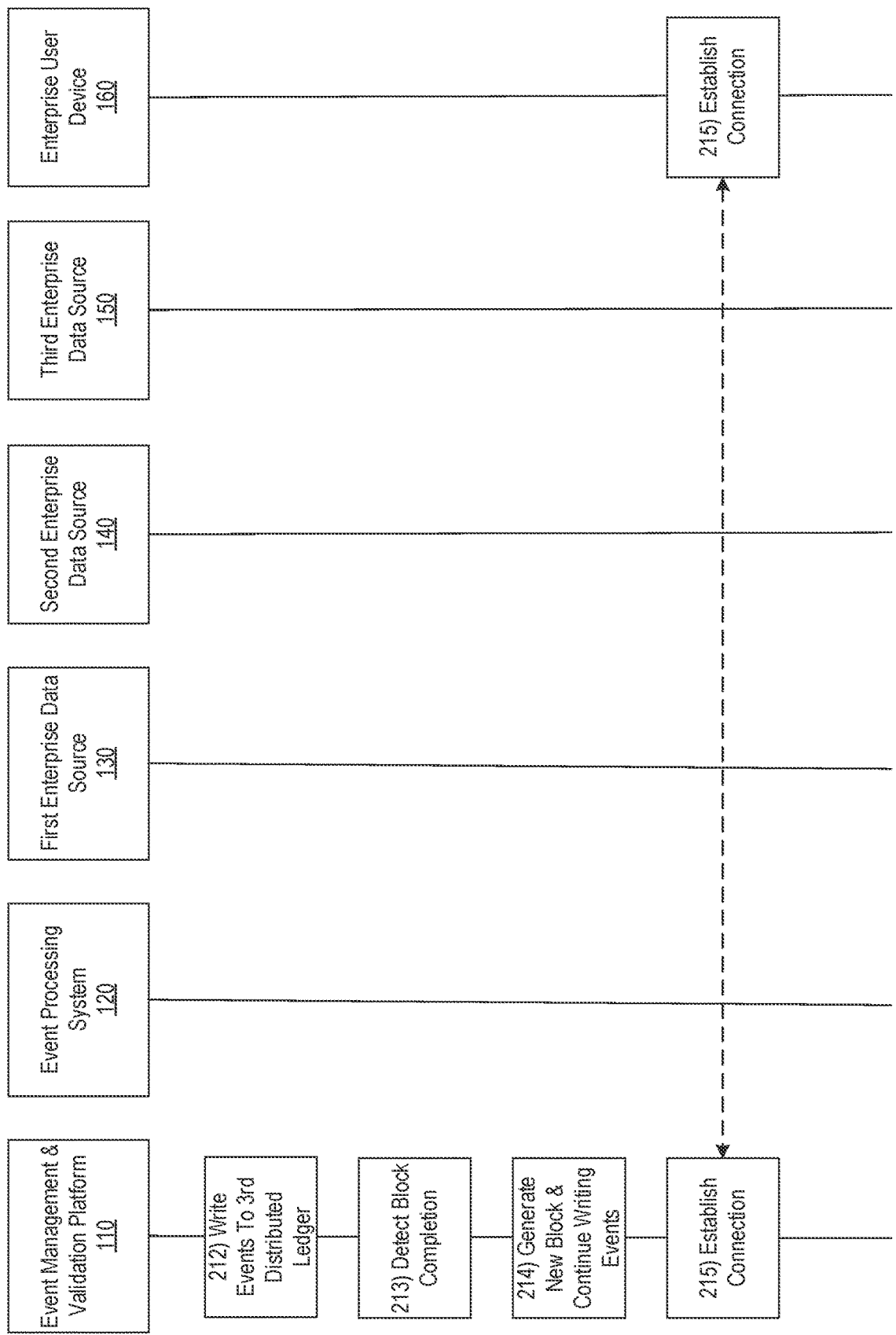

Referring to FIG. 2C, at step 212, the event management and validation platform 110 may begin to write events, based on the first event data, the second event data, and the third event data, to a third distributed ledger. In writing events to the third distributed ledger, the event management and validation platform 110 may identify events to be processed at a frequency lower than the event data stored in the first distributed ledger at step 210 and in the second distributed ledger at step 211. For example, the event management and validation platform 110 may identify that the third event data (which may, e.g., include information identifying loan and/or credit card transactions) may be processed at a slower frequency than the events described in the first event data and second event data. Accordingly, in this example, the event management and validation platform 110 may write the third event data to the third distributed ledger. In writing the third event data to the third distributed ledger, the event management and validation platform 110 may write the third event data to a third blockchain maintained by the event management and validation platform 110. In some instances, in addition to writing the third event data to the third distributed ledger, the event management and validation platform 110 may also write the first event data and the second event data to the third distributed ledger (e.g., the second distributed ledger may be a child blockchain of the third distributed ledger, and the third distributed ledger may include the events written to the first distributed ledger and second distributed ledger as well as additional events not written to the first distributed ledger or second distributed ledger). In some instances, the event management and validation platform 110 may validate the third distributed ledger at a lower frequency than the first and second distributed ledgers (e.g., because the third distributed ledger may contain more data than the other ledgers—i.e., the first event data, the second event data, and the third event data—and thus may take more time to validate). In one or more instances, in writing the third event data to the third distributed ledger, the event management and validation platform 110 may include hashing and/or encoding the third event data into a Merkle tree maintained at the event management and validation platform 110.

In writing different event data to the different distributed ledgers, the event management and validation platform 110 may be able to record and process a subset of the event data (e.g., the high frequency trading data) in real time (e.g., on the first distributed ledger), while recording an entire record of the event data (e.g., received from each data source) in the third distributed ledger to create a complete transaction record. In doing so, the event management and validation platform 110 may process and record the subset of the event data, while recording the entire record of the event data regardless of the fact the first distributed ledger, the third distributed ledger, and/or additional distributed ledgers (e.g., the second distributed ledger) are running at different speeds (e.g., that are based on timing of event data being received from each data source respectively).

It should be understood that although steps 210-212 are shown in sequential order, in some instances, steps 210-212 may occur simultaneously. Additionally or alternatively, steps 210-212 may begin as the event management and validation platform 110 begins receiving the event data from the various data sources (e.g., first enterprise data source 130, second enterprise data source 140, third enterprise data source 150, or the like). Furthermore, although three types of event data are described, it should be understood that event data of any number of types may be received from any number of enterprise data sources and similarly written to a distributed ledger in other arrangements. In addition, although three distributed ledgers are described in connection with this multi-tiered example, it should be understood that any number of distributed ledgers may similarly be maintained and written to by the event management and validation platform 110 in other arrangements.

Figure 5:
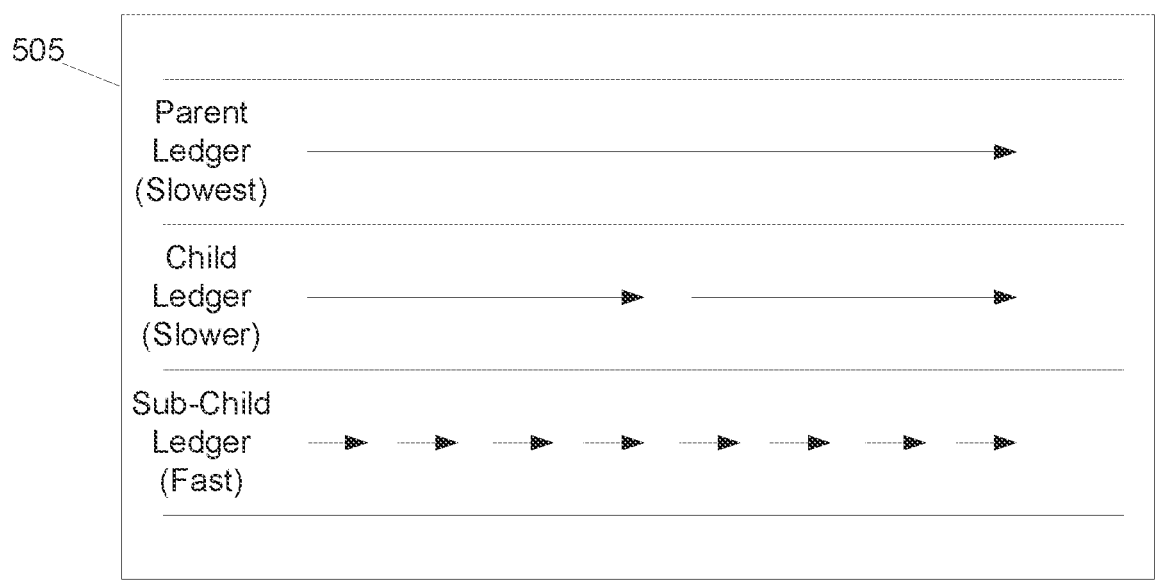
FIG. 5 depicts a graphical representation of a blockchain hierarchy that may be implemented for event validation and processing in accordance with one or more example embodiments.

In writing the events to the first, second, and third distributed ledgers, as described above in steps 210-212, the event management and validation platform 110 may generate and/or write to a series of distributed ledgers each moving at varied frequencies as shown in the exemplary distributed ledger illustration 505, which is shown in FIG. 5. For example, as described above, the event management and validation platform 110 may maintain a sub-child ledger (e.g., the first distributed ledger) that is writing, recording, validating, and/or processing events at a first speed, a child ledger (e.g., the second distributed ledger) that is writing, recording, validating, and/or processing events at a second speed (e.g., that is slower than the first speed), and a parent ledger (e.g., the third distributed ledger) that is writing, recording, validating, and/or processing events at a third speed (e.g., that is slower than the second speed).

At step 213, the event management and validation platform 110 may detect that an entry in one of the distributed ledgers is finished. For example, the event management and validation platform 110 may detect that a first entry in the second distributed ledger is complete (e.g., that a first block in the second blockchain is finished). Additionally or alternatively, the event management and validation platform 110 may detect that a first entry in the third distributed ledger is complete (e.g., that a first block in the third blockchain is finished). In these instances, the event management and validation platform 110 may detect that an amount available of storage associated with the entry has been reached, a predetermined time limit has been reached, or the like.

At step 214, in response to detecting that the entry identified at step 213 has finished, the event management and validation platform 110 may generate a new entry (e.g., a new block in the corresponding blockchain) and continue writing event data to the corresponding distributed ledger. In one or more instances, in creating the new block, the event management and validation platform 110 may hash the completed entry (e.g., the completed block) and may generate a numeric representation of a corresponding child distributed ledger. In these instances, the event management and validation platform 110 may store the hash and the numeric representation in the new entry, and may continue writing event data to the corresponding distributed ledger.

As an example, if at step 213, the event management and validation platform 110 detects a completed entry (e.g., a completed block) in the second distributed ledger (e.g., the second blockchain), then the event management and validation platform 110 may hash the completed entry. Additionally or alternatively, the event management and validation platform 110 may compute a numeric representation of its child distributed ledger (e.g., the first distributed ledger). In doing so, the event management and validation platform 110 may generate a 256 bit hexadecimal representation of the first distributed ledger (e.g., the first blockchain). In these instances, the event management and validation platform 110 may store the hash of the previous entry (e.g., the completed block) and the 256 bit hexadecimal representation of the first distributed ledger in the new entry of the second distributed ledger, and may continue writing event data to the new entry (e.g., the new block).

In some instances, by generating the numeric representation of a child blockchain (e.g., the first distributed ledger) for purposes of creating a new block (e.g., data entry) in the parent blockchain (e.g., the second distributed ledger), the event management and validation platform 110 may essentially represent the child blockchain (e.g., the first distributed ledger) as a single transaction to the parent blockchain (e.g., the second distributed ledger). In doing so, the event management and validation platform 110 may increase a validation speed of transactions represented in the child blockchain (e.g., the first distributed ledger) by the parent blockchain (e.g., the second distributed ledger).

Assuming, at step 213, that the event management and validation platform 110 detected a completed entry in the third distributed ledger, the event management and validation platform 110 may perform similar actions as those described above with regard to detecting a completed entry in the second distributed ledger. However, rather than generating a numeric representation of the first distributed ledger, the event management and validation platform 110 may generate a numeric representation of the second distributed ledger, responsive to detecting the completed entry in the third distributed ledger. In some instances, the event management and validation platform 110 may generate and store numeric representations of both the first distributed ledger and the second distributed ledger (e.g., a numeric representation of the first distributed ledger may be stored in the second distributed ledger, and a numeric representation of the second distributed ledger may be stored in the third distributed ledger).

At step 215, the event management and validation platform 110 may establish a connection with the enterprise user device 160. In some instances, the event management and validation platform 110 may establish a fourth wireless data connection with the enterprise user device 160 to link the event management and validation platform 110 to the enterprise user device 160. In some instances, the event management and validation platform 110 may identify whether or not a connection was already established with the enterprise user device 160. If a connection was previously established, the event management and validation platform 110 might not re-establish the fourth wireless data connection. However, if a connection was not previously established, the event management and validation platform 110 may establish the fourth wireless data connection as described herein.

Figure 2D:
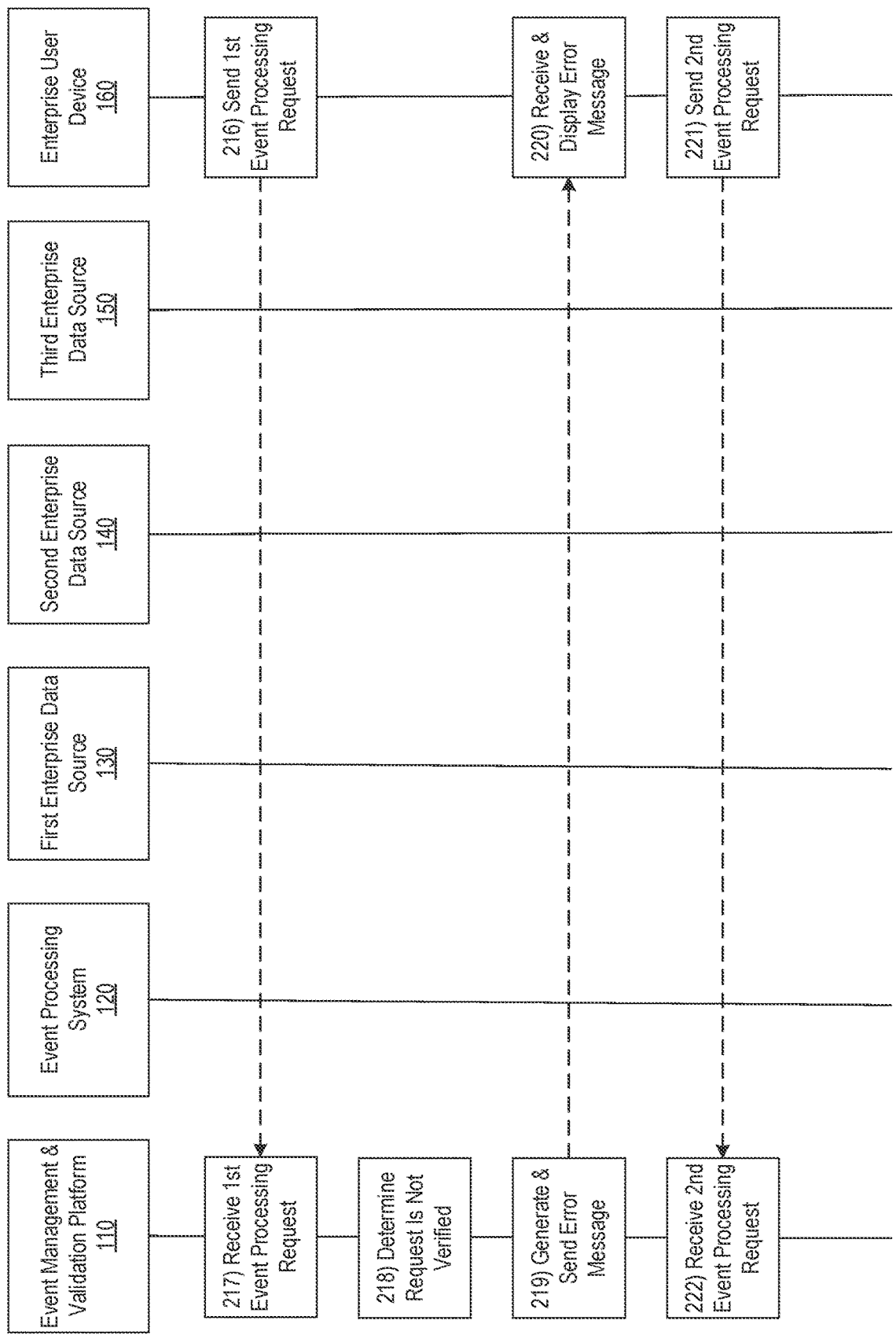

Referring to FIG. 2D, at step 216, the enterprise user device 160 may receive user input requesting processing of a first event, and the enterprise user device 160 may generate and send, share, or otherwise provide a first event processing request accordingly. For example, in sending the first event processing request, the enterprise user device 160 may send a request to process a loan transaction, credit card transaction, mutual fund transaction, ETF transaction, equity trade, cryptocurrency transaction, or the like. In some instances, the enterprise user device 160 may send the first event processing request to the event management and validation platform 110 while the fourth wireless data connection is established.

At step 217, the event management and validation platform 110 may receive or otherwise access the first event processing request, sent at step 216. In some instances, the event management and validation platform 110 may receive the first event processing request via the communication interface 113 and while the fourth wireless data connection is established.

At step 218, in response to the first event processing request received at step 217, the event management and validation platform 110 may attempt to verify the first event processing request. In some instances, in verifying the first event processing request, the event management and validation platform 110 may determine whether or not an account associated with the first event processing request has rights that make processing of the requested event permissible. For example, assuming that the event management and validation platform 110 received a request to sell a first ETF as the first event processing request, the event management validation platform 110 may identify whether an account associated with the first event processing request owns the first ETF, and thus has rights to sell the first ETF. To do so, in some instances, the event management and validation platform 110 may access a portfolio database and/or one of the distributed ledgers to identify whether the account owns the first ETF. For example, in some instances, the event management and validation platform 110 may read data from the distributed ledgers to identify transactions involving the account associated with the first event processing request and/or an asset in question (e.g., the first ETF). In doing so, the event management and validation platform 110 may verify that the asset (e.g., the first ETF) was both 1) previously purchased by the account associated with the first event processing request, and 2) not subsequently sold or otherwise transferred away from the account associated with the first event processing request. In this instance, it may be assumed that the event management and validation platform 110 may determine that the account associated with the first event processing request does not have rights that make the requested event permissible. Accordingly, the event management and validation platform 110 may determine that the first event processing request should not be processed.

At step 219, the event management and validation platform 110 may generate and send, share, or otherwise provide an error message to the enterprise user device 160. In one or more instances, the event management and validation platform 110 may send the error message to the enterprise user device 160 via the fourth wireless data connection and while the fourth wireless data connection is established. In some instances, the event management and validation platform 110 may also generate one or more commands directing the enterprise user device 160 to cause display of the error message. In some instances, in sending the error message, the event management and validation platform 110 may send a message indicating that the event requested in the first event processing request was not processed.

At step 220, the enterprise user device 160 may receive or otherwise access and display the error message sent at step 219. In some instances, the enterprise user device 160 may receive the error message sent at step 219 while the fourth wireless data connection is established. In some instances, the enterprise user device 160 may also receive the one or more commands directing the enterprise user device 160 to display the error message, and may display the error message in response to receiving the commands.

In some instances, in displaying the error message, the enterprise user device 160 may display a graphical user interface similar to graphical user interface 305, which is shown in FIG. 3. For example, the enterprise user device 160 may display a message indicating that a requested transaction could not be verified, and thus could not be processed.

At step 221, the enterprise user device 160 may receive user input requesting processing of a second event, and the enterprise user device 160 may generate and send, share, or otherwise provide a second event processing request accordingly. For example, in sending the second event processing request, the enterprise user device 160 may send a request to process a loan transaction, credit card transaction, mutual fund transaction, ETF transaction, equity trade, cryptocurrency transaction, or the like. In some instances, the enterprise user device 160 may send the second event processing request to the event management and validation platform 110 while the fourth wireless data connection is established. In sending the second event processing request, the enterprise user device 160 may perform actions similar to those described above with regard to the first event processing request at step 216.

At step 222, the event management and validation platform 110 may receive or otherwise access the second event processing request, sent at step 221. In some instances, the event management and validation platform 110 may receive the second event processing request via the communication interface 113 and while the fourth wireless data connection is established. In some instances, in receiving the second event processing request, the event management and validation platform 110 may perform actions similar to those described above with regard to the first event processing request at step 217.

Figure 2E:
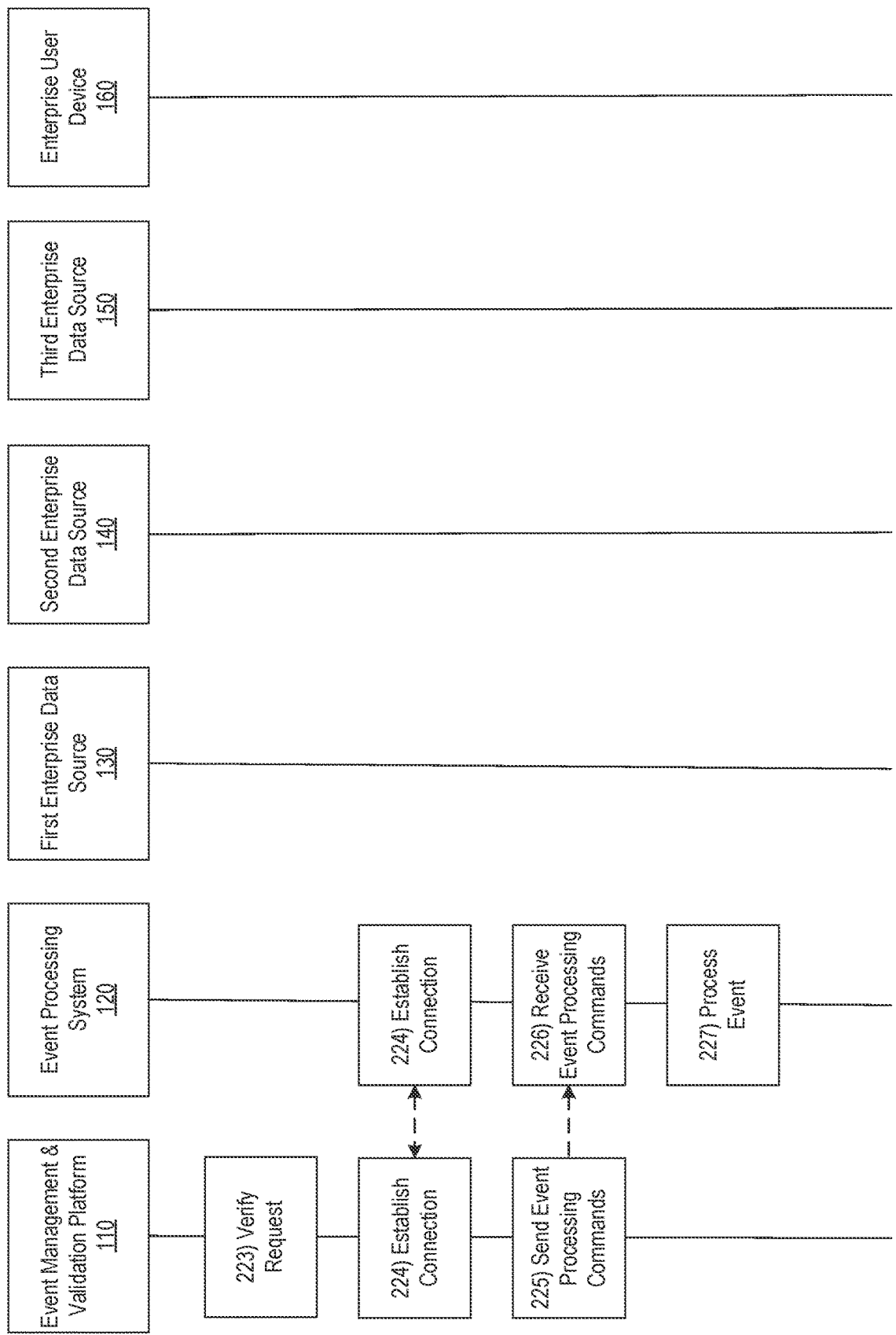

Referring to FIG. 2E, at step 223, in response to the second event processing request received at step 222, the event management and validation platform 110 may attempt to verify the second event processing request. In some instances, in verifying the second event processing request, the event management and validation platform 110 may determine whether or not an account associated with the second event processing request has rights that make processing of the requested event permissible. For example, assuming that the event management and validation platform 110 received a request for to sell a second ETF as the second event processing request, the event management validation platform 110 may identify whether an account associated with the second event processing request owns the second ETF, and thus has rights to sell the second ETF. To do so, in some instances, the event management and validation platform 110 may access a portfolio database and/or one of the distributed ledgers to identify whether the account owns the second ETF. For example, in some instances, the event management and validation platform 110 may read data from the distributed ledgers to identify transactions involving the account associated with the second event processing request and/or an asset in question (e.g., the second ETF). In doing so, the event management and validation platform 110 may verify that the asset (e.g., the second ETF) was both 1) previously purchased by the account associated with the first event processing request, and 2) not subsequently sold or otherwise transferred away from the account associated with the first event processing request. In this instance, in contrast to the determination at step 218 that the first event processing request was not verified, it may be assumed that the event management and validation platform 110 may determine that the account associated with the second event processing request does have rights that make the requested event permissible (e.g., the account owns the second ETF). Accordingly, the event management and validation platform 110 may determine that the second event processing request should be processed.

At step 224, the event management and validation platform 110 may establish a connection with the event processing system 120. In one or more instances, the event management and validation platform 110 may establish a fifth wireless data connection with the event processing system to link the event management and validation platform 110 to the event processing system 120. In one or more instances, the event management and validation platform 110 may identify whether a connection was already established with the event processing system 120. If a connection was already established, the event management and validation platform 110 might not re-establish the connection. If, however, a connection was not already established, the event management and validation platform 110 may establish the fifth wireless data connection as described herein.

At step 225, the event management and validation platform 110 may generate and send, share, or otherwise provide one or more commands directing the event processing system 120 to process the second event processing request (e.g., to sell the second ETF). In one or more instances, the event management and validation platform 110 may send the one or more event processing commands to the event processing system 120 via the communication interface 113 and while the fifth wireless data connection is established.

At step 226, the event processing system 120 may receive or otherwise access the one or more event processing commands, sent at step 225. In some instances, the event processing system 120 may receive the one or more event processing commands from the event management and validation platform 110 while the fifth wireless data connection is established.

At step 227, the event processing system 120 may process the second event processing request in response to the one or more event processing commands received at step 226. For example, the event processing system 120 may cause execution of a requested transaction, such as a loan transaction, credit card transaction, cryptocurrency transaction, mutual fund transaction, ETF transactions, equity trade, or the like.

Figure 2F:
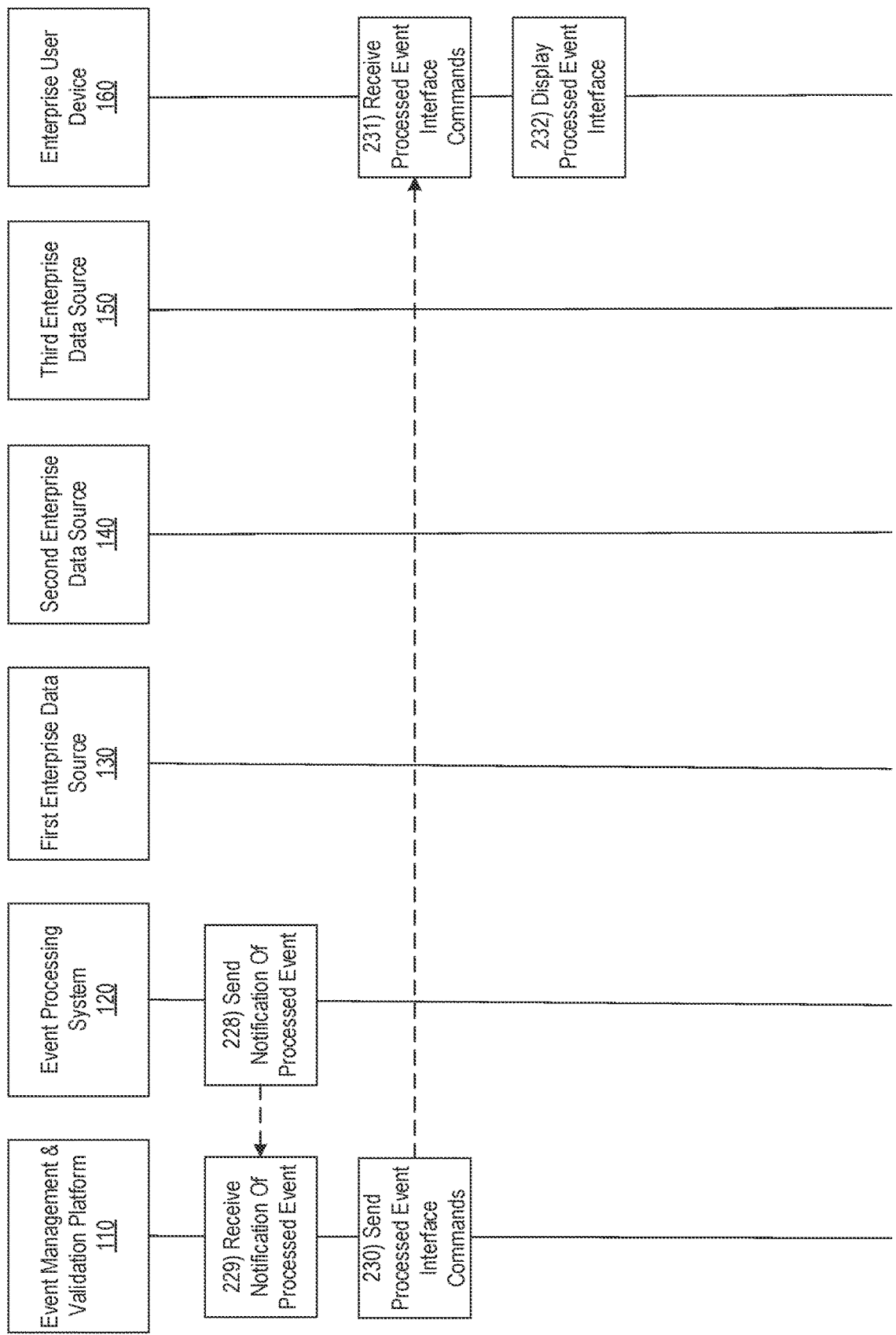

Referring to FIG. 2F, at step 228, once the second event processing request has been processed, the event processing system 120 may generate and send, share, or otherwise provide a notification to the event management and validation platform 110 indicating that the second event processing request has been processed (e.g., transaction has been completed). In some instances, the event processing system 120 may send the notification to the event management and validation platform 110 indicating that the second event processing request has been processed while the fifth wireless data connection is established.

At step 229, the event management and validation platform 110 may receive or otherwise access the notification indicating that the second event processing request has been processed that was sent at step 228. In some instances, the event management and validation platform 110 may receive the notification indicating that the second event processing request has been processed via the communication interface and while the fifth wireless data connection has been established.

At step 230, the event management and validation platform 110 may generate and send, share, or otherwise provide one or more commands directing the enterprise user device 160 to display an interface indicating that processing of the second requested event is complete. In one or more instances, the event management and validation platform 110 may send the one or more commands directing the enterprise user device 160 to display an interface indicating that processing of the second requested event is complete via the communication interface 113 and while the fourth wireless data connection is established.

At step 231, the enterprise user device 160 may receive or otherwise access the one or more commands directing the enterprise user device 160 to display an interface indicating that processing of the second requested event is complete that were sent at step 230. In some instances, the enterprise user device 160 may receive the one or more commands directing the enterprise user device 160 to display an interface indicating that processing of the second requested event is complete while the fourth wireless data connection is established.

At step 232, in response to the one or more commands directing the enterprise user device 160 to display an interface indicating that processing of the second requested event is complete, received at step 231, the enterprise user device 160 may display an interface indicating that the second requested event has been processed. In some instances, in displaying the interface indicating that the second requested event has been processed, the enterprise user device 160 may display a graphical user interface similar to graphical user interface 405, which is shown in FIG. 4. For example, the enterprise user device 160 may display an interface indicating that a requested transaction has been verified and completed as requested.

Although steps 201-232 are primarily described with regard to first enterprise data source 130, second enterprise data source 140, third enterprise data source 150, and enterprise user device 160, it should be understood that any number of data sources and/or user devices may be implemented in alternative arrangements of the methods described herein. Similarly, although a first, second, and third distributed ledger are described, in should be understood that the event management and validation platform 110 may maintain any number of distributed ledgers in alternative arrangements the methods described herein. Furthermore, although steps 201-232 are primarily described with regard to transaction processing, the systems and methods described herein may be applied in other use cases such as managing internet of things devices, managing healthcare information, or the like in alternative arrangements.

Figure 6:
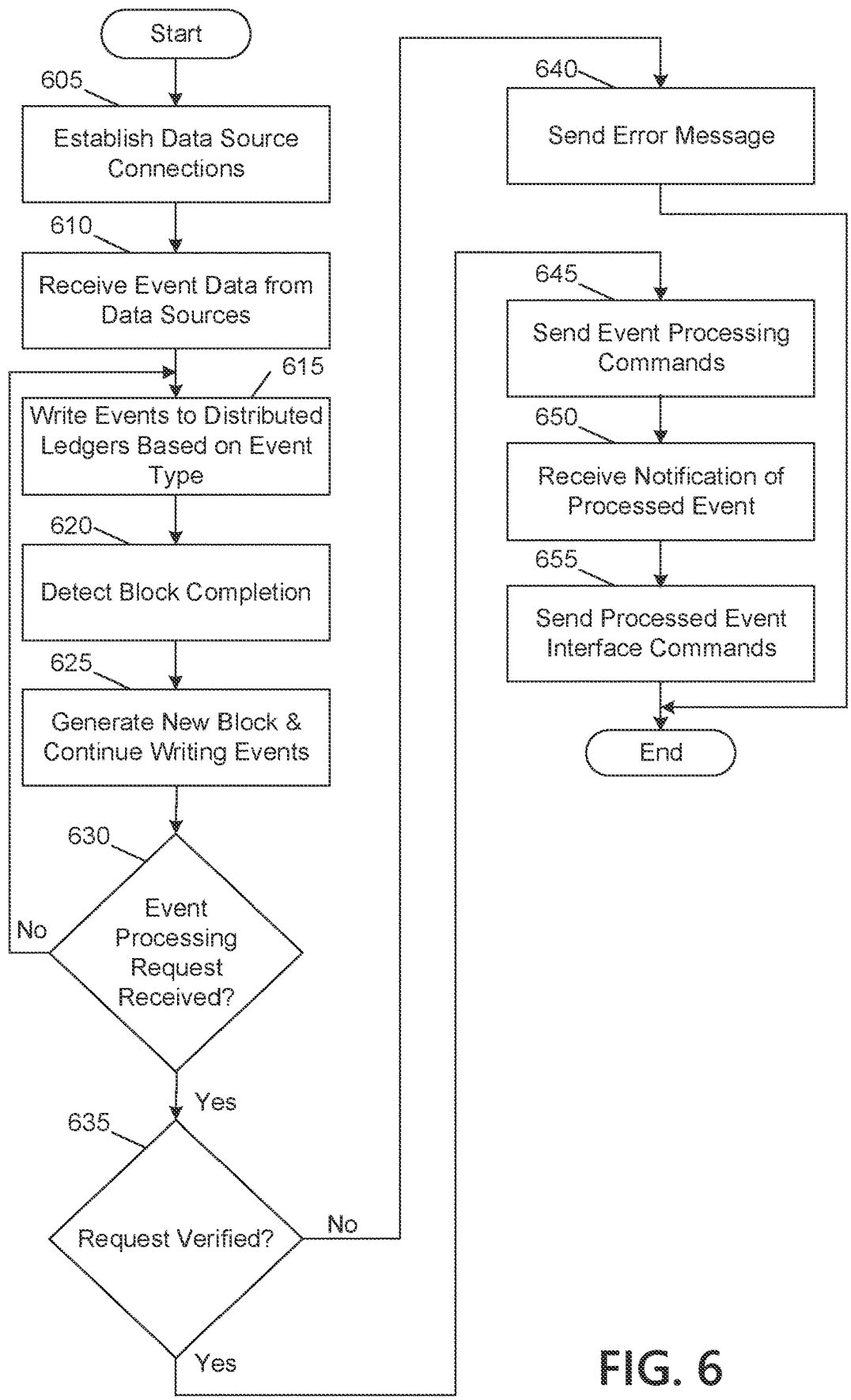
FIG. 6 depicts an illustrative method for implementing a recursive hierarchic blockchain in event validation and processing in accordance with one or more example embodiments.

FIG. 6 depicts an illustrative method that implements a recursive hierarchic blockchain for event validation and processing in accordance with one or more example embodiments. Referring to FIG. 6, at step 605, a computing platform having at least one processor, a communication interface, and memory may establish connections with one or more enterprise data sources. At step 610, the computing platform may receive event data from the one or more enterprise data sources. At step 615, the computing platform may write events from the event data to one or more distributed ledgers based on event type. At step 620, the computing platform may detect a block completion in one of the distributed ledgers. At step 625, the computing platform may generate a new block in the corresponding distributed ledger, and may continue writing events to the new block accordingly. At step 630, the computing platform may determine whether or not an event processing request has been received. If an event processing request has not been received, the computing platform may return to step 615 to continue writing events to the distributed ledgers. If an event processing request has been received, the computing platform may proceed to step 635.

At step 635, the computing platform may determine whether or not the event processing request is verified. If the computing platform determines that the event processing request is verified, the computing platform may proceed to step 645. If the computing platform determines that the event processing request is not verified, the computing platform may proceed to step 640.

At step 640, the computing platform may generate and send an error message indicating that the requested event has not been processed. At step 645, the computing platform may generate and send one or more event processing commands directing an event processing system to process the requested event. At step 650, the computing platform may receive a notification indication that the requested event has been processed. At step 655, the computing platform may generate and send one or more commands directing an enterprise user device 160 to generate and display a graphical user interface indicating that the requested event has been processed.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
     store, in a first distributed ledger, an event record for each event represented by first event data from a first data source, wherein the event records are processed, using the first distributed ledger, at a first speed;
     store, in a second distributed ledger, an event record for each event represented by the first event data and second event data from a second data source, wherein:
       the second event data is not stored in the first distributed ledger,
       the event records stored in the second distributed ledger comprise records that are processed at a second speed, slower than the first speed, and
       the second distributed ledger comprises a parent ledger to the first distributed ledger;
     store, in a new block of the second distributed ledger, a first hash and a numeric representation of the first distributed ledger; and
     write, to the new block of the second distributed ledger, additional event data from the first data source and the second data source.

2. The computing platform of claim 1, wherein the memory stores additional computer-readable instructions that, when executed by the at least one processor, further cause the computing platform to:
   receive an event processing request from a user device; and
   in response to receiving the event processing request from the user device, verify that processing of an event requested in the event processing request is permissible.

3. The computing platform of claim 2, wherein:
   the event processing request comprises a request from a user account to transfer one or more assets; and
   verifying that the processing of the event requested in the event processing request is permissible comprises verifying that the user account has rights to the one or more assets.

4. The computing platform of claim 3, wherein the memory stores additional computer-readable instructions that, when executed by the at least one processor, further cause the computing platform to:
   determine, by verifying that processing of the event requested in the event processing request is permissible, that the user account does have the rights to the one or more assets; and
   send, in response to determining that the user account does have the rights to the one or more assets, one or more commands directing an event processing system to process the event processing request, wherein sending the one or more commands directing the event processing system to process the event processing request results in transfer of the one or more assets from the user account.

5. The computing platform of claim 3, wherein the memory stores additional computer-readable instructions that, when executed by the at least one processor, further cause the computing platform to:
  determine, by verifying that processing of the event requested in the event processing request is permissible, that the user account does not have the rights to the one or more assets; and
  send, in response to determining that the user account does not have the rights to the one or more assets, one or more commands directing the user device to display an error message indicating that the event could not be processed, wherein sending the one or more commands directing the user device to display the error message causes the user device to display the error message.

6. The computing platform of claim 3, wherein the memory stores additional computer-readable instructions that, when executed by the at least one processor, further cause the computing platform to:
  receive third event data from a third data source;
  store, in third distributed ledger, an event record for each event represented by the third event data and the event records for each event represented by the first event data and the second event data;
  in response to determining that a validation condition for a current block of the third distributed ledger has been satisfied:
    compute a second hash, and
    generate a numeric representation of the second distributed ledger;
  store, in a new block of the third distributed ledger, the second hash and the numeric representation of the second distributed ledger; and
  write, to the new block of the third distributed ledger, additional event data from the first data source, the second data source, and the third data source.

7. The computing platform of claim 6, wherein:
  the event records stored in the third distributed ledger comprise records that are processed at a third speed, slower than the second speed.

8. The computing platform of claim 7, wherein:
  the event records stored in the first distributed ledger comprise records of equity trades;
  the event records stored in the second distributed ledger comprise records associated with one or more of: mutual funds or exchange traded funds (ETFs);
  the numeric representation of the first distributed ledger comprises a numeric representation of the records of the equity trades;
  the event records stored in the third distributed ledger comprise records associated with one or more of: loan transactions, credit card transactions, or cryptocurrency transactions; and
  the numeric representation of the second distributed ledger comprises a numeric representation of the records associated with the one or more of: the mutual funds or the ETFs.

9. The computing platform of claim 1, wherein the numeric representation of the first distributed ledger comprises a 256 bit hexadecimal number.

10. The computing platform of claim 1, wherein the storage of the first event data and the second event data in the second distributed ledger causes the event records stored in the second distributed ledger to be processed at the second speed, slower than the first speed at which the event records of the first distributed ledger are processed.

11. The computing platform of claim 1, wherein the memory stores additional computer-readable instructions that, when executed by the at least one processor, cause the computing platform to:
  receive the first event data from the first data source and the second event data from the second data source.

12. The computing platform of claim 1, wherein the first event data corresponds to a first event and the second event data corresponds to a second event, different than the first event.

13. The computing platform of claim 1, wherein the memory stores additional computer-readable instructions that, when executed by the at least one processor, cause the computing platform to:
  in response to determining that a validation condition for a current block of the second distributed ledger has been satisfied:
    compute the first hash, and
    generate the numeric representation of the first distributed ledger.

14. A method comprising:
  at a computing platform comprising at least one processor, a communication interface, and memory:
    storing, in a first distributed ledger, an event record for each event represented by first event data from a first data source, wherein the event records are processed, using the first distributed ledger, at a first speed;
    storing, in a second distributed ledger, an event record for each event represented by the first event data and second event data from a second data source, wherein:
      the second event data is not stored in the first distributed ledger,
      the event records stored in the second distributed ledger comprise records that are processed at a second speed, slower than the first speed, and
      the second distributed ledger comprises a parent ledger to the first distributed ledger;
    storing, in a new block of the second distributed ledger, a first hash and a numeric representation of the first distributed ledger; and
    writing, to the new block of the second distributed ledger, additional event data from the first data source and the second data source.

15. The method of claim 14, further comprising:
  receiving an event processing request from a user device; and
  in response to receiving the event processing request from the user device, verifying that processing of an event requested in the event processing request is permissible.

16. The method of claim 15, wherein:
  the event processing request comprises a request from a user account to transfer one or more assets; and
  verifying that the processing of the event requested in the event processing request is permissible comprises verifying that the user account has rights to the one or more assets.

17. The method of claim 16, further comprising:
determining, by verifying that processing of the event requested in the event processing request is permissible, that the user account does have the rights to the one or more assets; and
sending, in response to determining that the user account does have the rights to the one or more assets, one or more commands directing an event processing system to process the event processing request, wherein sending the one or more commands directing the event processing system to process the event processing request results in transfer of the one or more assets from the user account.

18. The method of claim 16, further comprising:
determining, by verifying that processing of the event requested in the event processing request is permissible, that the user account does not have the rights to the one or more assets; and
sending, in response to determining that the user account does not have the rights to the one or more assets, one or more commands directing the user device to display an error message indicating that the event could not be processed, wherein sending the one or more commands directing the user device to display the error message causes the user device to display the error message.

19. The method of claim 14, further comprising:
receiving third event data from a third data source;
storing, in third distributed ledger, an event record for each event represented by the third event data and the event records for each event represented by the first event data and the second event data;
in response to determining that a validation condition for a current block of the third distributed ledger has been satisfied:
computing a second hash, and
generating a numeric representation of the second distributed ledger;
storing, in a new block of the third distributed ledger, the second hash and the numeric representation of the second distributed ledger; and
writing, to the new block of the third distributed ledger, additional event data from the first data source, the second data source, and the third data source.

20. One or more non-transitory computer-readable media storing instructions that, when executed by a computing platform comprising at least one processor, a communication interface, and memory, cause the computing platform to:
store, in a first distributed ledger, an event record for each event represented by first event data from a first data source, wherein the event records are processed, using the first distributed ledger, at a first speed;
store, in a second distributed ledger, an event record for each event represented by the first event data and second event data from a second data source, wherein:
the second event data is not stored in the first distributed ledger,
the event records stored in the second distributed ledger comprise records that are processed at a second speed, slower than the first speed, and
the second distributed ledger comprises a parent ledger to the first distributed ledger;
store, in a new block of the second distributed ledger, a first hash and a numeric representation of the first distributed ledger; and
write, to the new block of the second distributed ledger, additional event data from the first data source and the second data source.

* * * * *